H. P. KRAFT.
VALVE REPAIR TOOL.
APPLICATION FILED NOV. 4, 1915.

1,199,084.

Patented Sept. 26, 1916.

WITNESSES:
René Bruine
Fred White

INVENTOR:
Henry P. Kraft,
By Attorneys,
Fraser Turk Winger

UNITED STATES PATENT OFFICE.

HENRY P. KRAFT, OF RIDGEWOOD, NEW JERSEY.

VALVE-REPAIR TOOL.

1,199,084.   Specification of Letters Patent.   Patented Sept. 26, 1916.

Application filed November 4, 1915. Serial No. 59,602.

*To all whom it may concern:*

Be it known that I, HENRY P. KRAFT, a citizen of the United States of America, residing in Ridgewood, in the county of Bergen and State of New Jersey, have invented certain new and useful Improvements in Valve-Repair Tools, of which the following is a specification.

This invention relates to valve repair tools, and aims to provide certain improvements therein.

The invention is particularly directed to a combination tool for use in performing various repair operations upon pneumatic tire valves and other similar devices. Usually such tools have been provided with a tap designed to clean or repair the internal threads of the tire valve; a die adapted to repair the external threads of the valve, and a screw-driver adapted to be passed within the valve and used as a tool for unscrewing the valve insides or plungers. To these are sometimes added a facing tool for repairing the cap seat at the top of the tire valve. In some tools of this class the die and facing tool have been made of a cylindrical piece of metal and the tap and screw-driver have been formed upon a bar which passes through the first mentioned member. In such constructions the cylindrical member is used as a handle for the other two tools. This is desirable in the use of a tap since the cylindrical member affords a very considerable leverage, so that sufficient power may be applied to the tap. In this or other constructions where such leverage is afforded, however, it acts detrimentally in the use of the screw-driver. The valve insides or plungers are small and light and many users in screwing them into the shell by the use of the screw-driver use such force as to either strip the screw-driver or break the plungers. According to the present invention I provide means whereby such leverage cannot be exerted in the use of the screw-driver.

Figure 1:
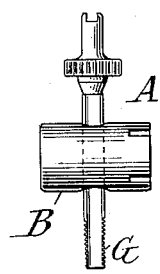
Figure 2:
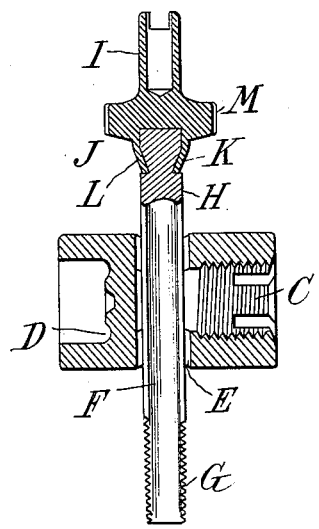
Figure 3:
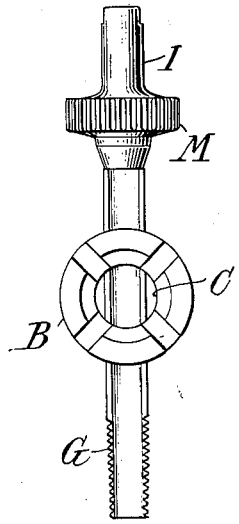
Figure 4:
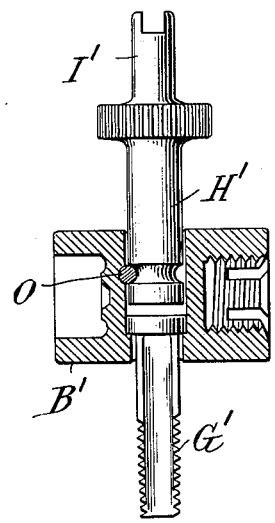

In the accompanying drawings, wherein I have illustrated several forms of the invention,—Figure 1 is an elevation of the preferred form of the device. Fig. 2 is a central vertical section thereof on an enlarged scale. Fig. 3 is an elevation at right angles to Fig. 1 on an enlarged scale. Fig. 4 is a sectional view of a modification.

Referring first to Figs. 1 to 3 of the drawings, let A indicate the tool as a whole. In the particular construction shown the tool is formed with a cylindrical portion B, one end of which (Fig. 2) is usually constructed with a die C for dressing the outside threads of a tire valve and the other of which is usually formed with a cutter face D for dressing the top portion or cap seat of the valve. It is desirable that these two tools should be of considerable length in order that they may be guided accurately in their operations. In the type of tool shown the portion B is formed with a recess E within which is held a bar F, one end of which is usually formed with a tap G for dressing the inside threads of the valve. The other end of the bar F has heretofore been formed with a notch adapted to engage a ridge on the upper end of the plunger or insides, which screw into the valve. It is customary to form a notch directly in the end F which is suitably recessed to receive the valve stem. In the use of the die C or facing tool D the ends of the bar F are used as handles, while conversely the cylinder B is used as a handle for the tap G and screw-driver. By reason of the shape and size of the cylinder B it is quite evident that a powerful rotative movement can be imparted to the two tools just mentioned, which in the case of the tap G is necessary or desirable for the purpose. In the case of the screw-driver projection, however, this powerful thrust results in many instances in either breaking the end of the screw-driver or in disrupting the ridge on the valve insides. The latter is quite disadvantageous, since it is then very difficult for the ordinary user to remove the insides. In other constructions of tools than that illustrated there is an equivalent handle or operating part which takes the place of the cylinder B, such handle or operating part being practically essential in order to properly actuate the tap G. According to the present invention I provide a construction in which it is impossible to exert sufficient force on the screw-driver by the use of the hand to disrupt either the tool or the insides. In the preferred construction this is secured by swiveling a screw-driver I to a part of the tool, and preferably the end H of the bar F. This result may be accomplished in any suitable way, as for instance, by forming the body of the screw-driver with a recess J, and the end H with a groove into which the flange L is bent. This permits the cylindrical part B to be rotated without any effect on the screw-driver. The latter is provided with a smaller grasping portion, such as M, which corresponds in practice to the usual form of valve cap. Sufficient force cannot be applied by the user to the portion M to disrupt either the cap or the valve insides.

In Fig. 4 the gap G' is made separately from the portion H' of the screw-driver, and the latter is swiveled to the cylindrical body B' by forming a groove in the portion H' and inserting a pin O in the cylindrical portion, which pin enters the groove and prevents the screw-driver portion from being removed, while permitting relative rotation of the cylinder B' and screw-driver. Many other constructions suggest themselves by which the two parts may be swiveled together. In Fig. 4 the tap is fixed against rotation with respect to the cylinder by frictional or other means.

While I have shown and described several forms of the invention, it will be understood that I do not wish to be limited thereto.

What I claim is:—

1. In a device of the character described, a handle portion and screw-driver projection adapted to enter a valve shell and swiveled to said handle portion, and said projection having a grasping portion of larger diameter than the projection, whereby the screw-driver projection is rotated independently of the handle portion.

2. In a device of the character described, a handle portion, a tap fixed against rotation with reference to the handle portion, and a screw-driver swiveled to the rear end of said tap, said screw-driver having a manipulating portion of larger diameter than the screw-driver portion.

3. A device of the character described, having a die and a cutter arranged to face in opposite directions, said die and cutter constituting a handle and a screw-driver projection swiveled with relation to said handle, said screw-driver portion having a manipulating flange of larger diameter than the projection, and said screw-driver projection being adapted to be rotated in either direction without rotating said handle portion.

In witness whereof, I have hereunto signed my name in the presence of two subscribing witnesses.

HENRY P. KRAFT.

Witnesses:
 E. V. MYERS,
 FRED WHITE.